Nov. 7, 1939.     T. L. SHERMAN     2,178,972
CRANKLESS MECHANISM
Filed April 20, 1938
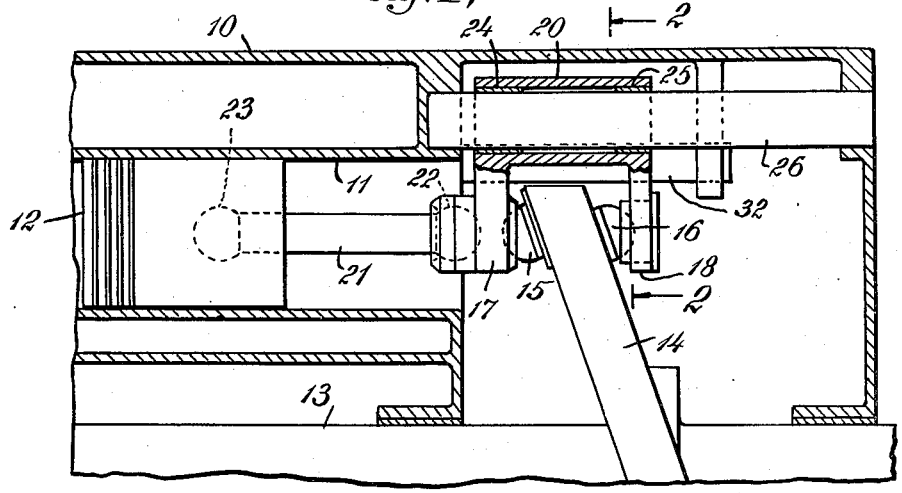
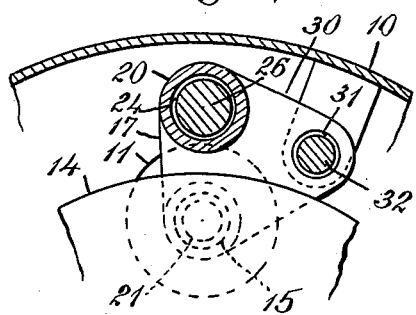
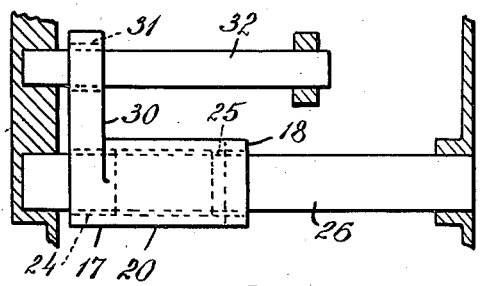
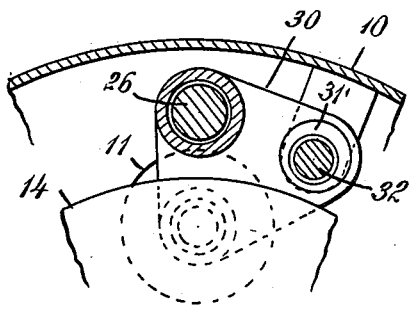
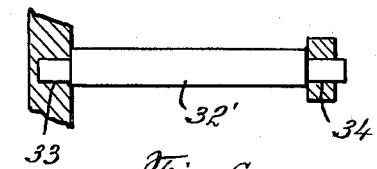
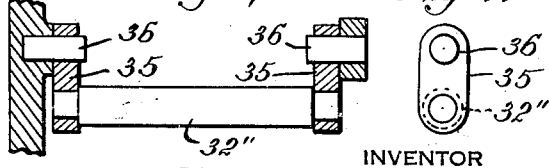
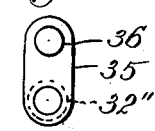
INVENTOR
Thomas L. Sherman
BY
Marshall & Hawky
ATTORNEYS Patented Nov. 7, 1939

2,178,972

UNITED STATES PATENT OFFICE 2,178,972

CRANKLESS MECHANISM

Thomas L. Sherman, Buffalo, N. Y., assignor to Michell-Crankless Engines Corporation, New York, N. Y., a corporation of New York Application April 20, 1938, Serial No. 203,135

6 Claims. (Cl. 74—56)

This invention relates to crankless mechanisms in which power is transmitted from the pistons to a shaft by means of slipper pads carried by a reciprocating unit or bridge connected to the pistons and engaging a slant or swash plate mounted on the shaft.

More particularly stated, the invention relates to means for guiding the reciprocating unit or bridge during its reciprocation.

In mechanism such as crankless engines it is necessary to guide the bridge or unit in such a manner that the bridge will be reciprocated in a path parallel to the shaft, thus maintaining uniform clearance between the slipper pads and the slant.

This invention has for its salient object, therefore, to provide guiding means for the reciprocating unit or bridge of crankless mechanism of the character described, so constructed and arranged as to insure the reciprocation of the unit or bridge in a path parallel to the shaft and to prevent lateral displacement of the bridge relative to the piston, in such magnitude as to cause undesirable movement or strain in its connection with same.

Further objects of the invention will appear from the following specification taken in connection with the drawing which forms a part of this application, and in which Fig. 1 is a longitudinal sectional elevation through a portion of a crankless mechanism, showing bridge guiding means constructed in accordance with the invention;

Fig. 2 is a transverse sectional elevation taken substantially on line 2—2 of Fig. 1;

Fig. 3 is a sectional elevation showing in plan the bridge and guiding means therefor;

Fig. 4 is a view similar to Fig. 2 but showing a slightly modified form of the invention;

Fig. 5 is a detail sectional elevation showing another modification of the mounting for one of the guide rods; and Figs. 6 and 7 illustrate in longitudinal and end elevation, another modified form of adjustable mounting for one of the guide rods.

The invention briefly described comprises crankless mechanism including a cylinder, a piston reciprocable therein, a shaft, a slant on the shaft, a bridge connected to the piston and having portions embracing the outer edge portions of the slant, the embracing portions having mounted therein slipper pads for engaging the opposite faces of the slant, and means for guiding the bridge during its reciprocation in such a manner that it will reciprocate in a path parallel to the shaft and will have no tendency to be displaced laterally during its reciprocation. The bridge guiding means consists of a pair of guide rods, the bridge having a sleeve provided with longitudinally spaced bushings disposed above the slipper pad mountings and mounted on one guide rod and having an extension provided with a bushing mounted on the other guide rod. The second guide rod prevents rotation of the bridge about the other guide rod and so restricts displacement of the embracing portions. It may, if desired, be made adjustable relative to the first rod, or means provided in its coaction to compensate for variation in the spacing of the two rods.

Further details of the invention will appear from the following description.

In the particular embodiment of the invention illustrated, there is shown a portion of a crankless mechanism or engine casing 10 having a cylinder 11, a piston 12 reciprocatable in the cylinder and a shaft 13. The shaft has mounted thereon a slant or swash plate 14.

The reciprocation of the piston is communicated to the slant by means of slipper pads 15, 16 which are pivoted in the legs or embracing portions 17 and 18 of a bridge or reciprocating unit. The slipper pads 15 and 16 coact with the opposite faces of the slant to transmit the motion of the piston thereto.

The legs or embracing portions 17 and 18 of the bridge are integral with or rigidly connected to a sleeve 20 located beyond the periphery of the slant and substantially parallel to the axis of the slipper pads.

The portion 17 of the bridge is connected to the piston 12 by a connecting rod 21 which, in the form of the invention shown, is pivoted at its ends 22 and 23 to the portion 17 and the piston 12 so as to permit guidance of the bridge entirely independent of piston reactions.

The sleeve 20 which forms the body portion of the bridge, is provided at its ends or at sufficient longitudinal distance apart, with bushings 24 and 25 and the sleeve and bushings are mounted on a guide rod 26 supported in the engine casing.

The coaction between the bushings 24 and 25 and the guide rod 26 insure stable reciprocation of the bridge or reciprocating unit in a path parallel to the shaft 13.

In order to prevent any tendency of the reciprocating unit or bridge to rotate on the guide rod 26 during its reciprocation and so cause lateral displacement of the bridge with respect to the piston, the bridge has formed on one side thereof an extension 30 having mounted therein a bushing 31 which is mounted on a second guide rod 32 disposed at a suitable distance from rod 26. The arm 31 is shown as located at the piston end of the bridge member in Fig. 3. This is a convenient arrangement, but not essential to the construction. Any longitudinal position in the length of the bridge may be selected.

The guide rod 32 may, if desired, be fixed relative to the rod 26 or the rod 32 may be adjustably mounted relative to rod 26 in order to take care of any slight inaccuracy or irregularity in manufacture, or expansion effects during operation.

In Fig. 4 the bushing 31' is freely mounted in the bridge arm and has an eccentrically arranged opening for receiving the guide rod. Any slight inaccuracies or variations in the spacing of the rods 26 and 32 can be taken care of by the rotation of the bushing within the bridge arm.

In Fig. 5 the rod 32' has eccentric trunnions 33 and 34 at the end thereof and by rotating the rod 32' about the trunnions, inaccuracies or variations in the spacing of the rods 26 and 32' can be taken care of. An alternative construction is shown in Figs. 6 and 7. In Figs. 6 and 7 the eccentric trunnions are replaced by swinging links 35 attached to engine casing at 36. The rod 32" is mounted in the links 35.

It is essential for correct operation that the center line joining the center of the eccentric opening and the center of the rod 32 be at right angles to the center line joining the centers of the rods 26 and 32. This statement also applies to the center line joining the center of the trunnions 33, 34 and the rod 32' in Fig. 5 and the line joining the centers of the pins or studs 36 and rod 32" in Figs. 6 and 7.

From the foregoing specification it will be clear that simple, practical and effective guiding means has been provided for guiding the reciprocating unit or bridge of a crankless mechanism during its reciprocation and that this guiding means effectively insures stable reciprocation of the unit in the path parallel to the shaft and, furthermore, overcomes any tendency of the bridge or unit to be displaced laterally during its reciprocation.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In a crankless mechanism, a cylinder, a piston reciprocatable therein, a shaft, a slant mounted on the shaft, a bridge flexibly connected to the piston and having portions on opposite sides of said slant, slipper pads mounted in said portions engaging the slant, a guide rod for said bridge disposed parallel with the center line of said slippers, and a second guide rod spaced from the first rod, said bridge being mounted to slide on said rods, one of said rods being adjustable toward and away from the other rod.

2. In crankless mechanism, a cylinder, a piston reciprocatable therein, a shaft, a slant mounted on the shaft, a bridge connected to the piston and having portions on opposite sides of said slant, slipper pads mounted in said portions engaging the slant, a guide rod for said bridge, the bridge comprising a sleeve slidably mounted on the rod and bridging the space between the spaced portions of the bridge, and a second guide rod spaced from the first rod, said bridge being mounted to slide on said rods, one of said rods being adjustable toward and away from the other rod.

3. In crankless mechanism, a cylinder, a piston reciprocatable therein, a shaft, a slant mounted on the shaft, a bridge flexibly connected to the piston and having portions on opposite sides of said slant, slipper pads mounted in said portions engaging the slant, a guide rod on which the bridge is slidably mounted, a second guide rod, and an extension extending laterally from the bridge and slidably engaging said second guide rod, said extension having an adjustably mounted bushing for receiving said second guide rod.

4. In crankless mechanism, a cylinder, a piston reciprocatable therein, a shaft, a slant mounted on the shaft, a bridge connected to the piston and having portions on opposite sides of said slant, slipper pads mounted in said portions engaging the slant, a guide rod on which the bridge is slidably mounted, a second guide rod, and an extension extending laterally from the bridge and slidably engaging said second guide rod, said extension being disposed substantially in line with the slipper pad receiving portion of the bridge on the piston end of the bridge and having a bushing for receiving said second guide rod, the bushing being mounted for movement relative to the first guide rod.

5. In crankless mechanism, a cylinder, a piston reciprocatable therein, a shaft, a slant mounted on the shaft, a bridge connected to the piston by a connecting rod pivoted to the piston and to the bridge, said bridge having portions on opposite sides of said slant, slipper pads mounted in said portions engaging the slant, a guide rod on which the bridge is slidably mounted, a second guide rod, and an extension extending laterally from the bridge and slidably engaging said second rod, said extension having an eccentric bushing for receiving said second guide rod.

6. In crankless mechanism, a cylinder, a piston reciprocatable therein, a shaft, a slant mounted on the shaft, a bridge connected to the piston by a connecting rod pivoted to the piston and to the bridge, said bridge having portions on opposite sides of said slant, slipper pads mounted in said portions engaging the slant, a guide rod on which the bridge is slidably mounted, a second guide rod, and an extension extending laterally from the bridge and slidably engaging said second guide rod, one of said guide rods being adjustable relative to the other guide rod.

THOMAS L. SHERMAN.